No. 756,339. Patented April 5, 1904.

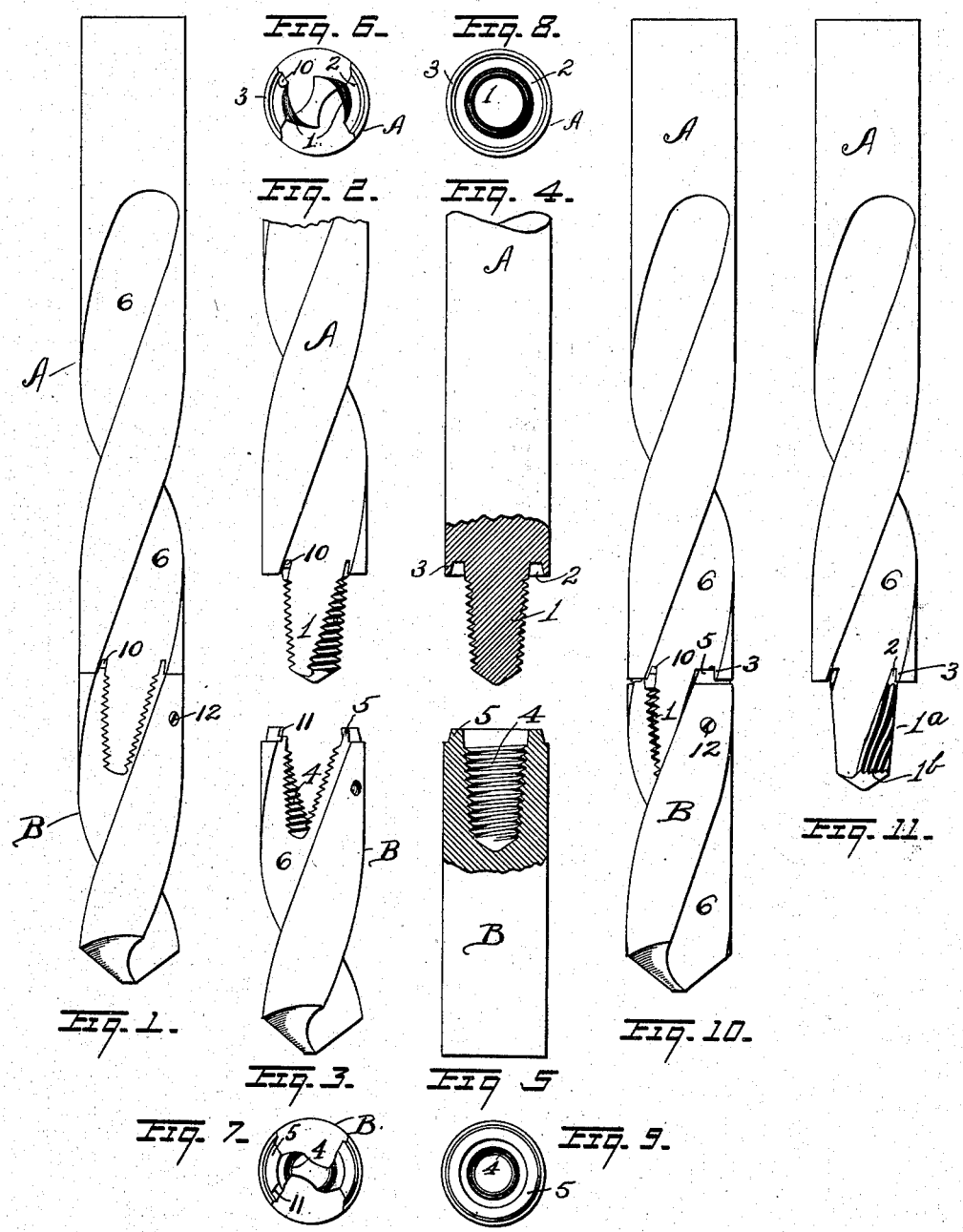

UNITED STATES PATENT OFFICE.

WILLIAM R. DOWN, OF READING, PENNSYLVANIA.

COMPOSITE DRILL.

SPECIFICATION forming part of Letters Patent No. 756,339, dated April 5, 1904.

Application filed November 14, 1903. Serial No. 181,260. (No model.)

*To all whom it may concern:*

Be it known that I, WILLIAM R. DOWN, a citizen of the United States, residing in the city of Reading, county of Berks, State of Pennsylvania, have invented certain new and useful Improvements in Composite Drills, of which the following is a specification.

My invention relates particularly to that class of drills technically known as "twist-drills;" and my object is to provide an improved two-part construction providing for the ready and satisfactory renewal of the cutting end portion of the drill upon the repeatedly-used body or shank portion of same.

The "high-speed" alloy steel now largely employed for twist-drills and other metal-cutting tools because of its being adapted to maintain its hardness notwithstanding the ordinarily ruinous heating incident to present high-speed work is so high-priced as to cause an excessive loss in discarding the main portion of a drill after the cutting end portion thereof has been reduced by service. Moreover, this high-grade steel while remarkably well adapted for cutting purposes is rather inferior to much lower-priced material so far as the shank requirements are concerned. In view of these facts a twist-drill of composite structure would obviously be advantageous, providing that the different materials comprising it be so united as to both insure satisfactory operation as a complete tool and convenient and accurate renewal of the cutting end portion thereof when required. My invention relates to improved means of effecting this, as particularly described hereinafter in connection with the accompanying drawings, and the novel features of which are specifically pointed out in the subjoined claims.

Figure 1 is an elevation of a complete two-part drill embodying my complete invention. Figs. 2 and 3 are separate elevations of the two parts disunited. Figs. 4 and 5 are similar views of the two parts as first formed preliminary to forming the spiral grooves therein. Figs. 6 and 7 are separate plan views of the engaging ends of the completed respective portions, and Figs. 8 and 9 are similar views of the ungrooved parts indicated in Figs. 4 and 5. Fig. 10 shows the two parts in position to be united by a quarter-turn. Fig. 11 indicates a modification.

The body or shank portion A and the cutting end portion B of the drill are formed of different material, as already stated, the former being preferably of an ordinarily comparatively low carbon steel and the latter of alloy steel, such as "tungsten-steel," especially adapted for high-speed cutting, as described. These parts I first form separately into ungrooved cylindrical bars, as indicated in Figs. 4, 5, 8, and 9, the part A, with a reduced and preferably tapered screw-threaded extension 1, having an annular recess or groove 2 at the base thereof to form a cylindrical flange or collar 3, and the part B a correspondingly-screw-threaded recess or socket 4 and a reduced cylindrical collar 5, adapted to accurately fit into said annular recess or groove 2 of the part A. This work may be readily done at small cost by means of automatic machinery and suitable tools, insuring accuracy and interchangeability, so that the two parts will be closely fitted and seated, as required, when screwed together for the grooving operation, which is then effected as usual.

The parallel spiral grooves 6 6 thus cut in the united parts cut away the walls of the recess or socket 4 in the part B, so as to form side openings thereto, as indicated in Fig. 3, and also cut into the extension 1 of the latter to less than the size of the side openings in part B, thus allowing the two symmetrically-grooved parts to be disengaged, as indicated in Fig. 10, by merely giving approximately a quarter-turn to one part relative to the other, and they may of course be reunited at any time in a similar manner by merely placing them in the Fig. 10 position, with their axes in line engaging the edges of the threads and giving a quarter-turn, which simultaneously sets the spiral grooves accurately into line with each other and firmly seats the abutting ends, with the remaining segmental collar portions 3 of part A firmly inclosing the reduced segmental collar portions 5 of part B, so as to reinforce and thereby prevent possible spread of the latter.

In order to positively limit the turning movement of one part upon the other, and thereby prevent possible slight misalinement of the grooves or undue jamming of the parts under strain of heavy surface, I insert a stop-pin 10 at a proper point in the annular recess 2 of part A to engage a shoulder 11, formed by cutting away a small end portion of the segmental collar 5 on part B, thereby insuring the retention of the parts in symmetrical union, as indicated in Fig. 1, and I also provide against possible loosening of the connection between the parts during the withdrawal movement of the drill by employing a set-screw 12, engaging a small lateral opening in the part B and adapted to be set up against the inserted extension 1 of part A.

The cutting end portions B, required for the renewal of old drills, are separately made in a similar manner in connection with a standard body portion and their union made with the old body portion as preferably made in the department commonly provided to care for such tools.

While my complete invention is preferably employed in the manner particularly described and shown, it is obvious that certain features thereof may be dispensed with or modified.

In the modification indicated in Fig. 11 the extension 1ª upon the part A is socketed in the part B without employing the screw-threaded engagement of Figs. 1 to 10, the engagement of the collar-segments, however, being similar to the preferred construction, and inclined ribs 1ᵇ being provided on one of the parts to engage a correspondingly-grooved recess in the other, and thereby prevent any turning of one part relative to the other.

What I claim is—

1. A twist-drill, having a cutting end portion and a body portion, one of said portions having a threaded tapered extension and the other having a corresponding axial recess to receive the same, said extension having its sides cut away to jointly form parts of the spiral grooves of the drill.

2. A twist-drill having a cutting end portion separably secured to a body portion by means of an extension on one of said portions having a screw-threaded engagement with an axial recess therefor in the other portion, the sides of said extension and of said recessed portion being cut away to jointly form part of the spiral grooves of the drill.

3. A twist-drill having a cutting end portion separably secured to a body portion by means of an extension on one of said portions having a screw-threaded engagement with an axial recess therefor in the other portion, the sides of said extension and of said recessed portion being cut away to jointly form part of the spiral grooves of the drill and the end of said extension being solidly bottomed in said recess.

4. A twist-drill, having a cutting end portion and a body portion, one of said portions having a screw-threaded tapered extension and reinforcing collar-segments, and the other of said portions having a threaded axial recess which corresponds to and receives said extension and also having collar-segments of reduced diameter which are inclosed by said reinforcing collar-segments, and said tapered extension having its sides cut away to jointly form parts of the spiral grooves of the drill.

5. A twist-drill having a cutting end portion separably secured to a body portion by means of an extension on one of said portions engaging an axial recess therefor in the other portion, the sides of said extension being cut away to form part of the spiral grooves of the drill and a stop-pin and shoulder being provided on the abutting portions.

In testimony whereof I affix my signature in the presence of two witnesses.

WILLIAM R. DOWN.

Witnesses:
 D. M. STEWART,
 W. G. STEWART.